United States Patent [19]

Kanayama

[11] Patent Number: 4,715,772
[45] Date of Patent: Dec. 29, 1987

[54] APPARATUS FOR AUTOMATIC GLAZING OF CARS

[75] Inventor: Hideaki Kanayama, Toyama, Japan

[73] Assignees: Kabushiki Kaisha Fujikoshi, Toyama; Mazda Motor Corporation, Hiroshima, both of Japan

[21] Appl. No.: 853,912

[22] Filed: Apr. 21, 1986

[30] Foreign Application Priority Data

May 30, 1985 [JP] Japan ................................. 60-115375

[51] Int. Cl.⁴ ............................................. B25J 11/00
[52] U.S. Cl. ................................. 414/730; 414/744 B; 901/7; 901/9; 29/705; 29/720; 364/513; 364/478; 358/101; 358/107
[58] Field of Search .................... 901/7, 9, 47; 198/502.2, 341; 29/407, 705, 714, 720; 364/468, 478, 513 P; 318/568; 356/375; 358/101, 107; 414/730, 735, 737, 744 B

[56] References Cited

U.S. PATENT DOCUMENTS

| | | | |
|---|---|---|---|
| 3,888,362 | 6/1975 | Fletcher et al. | 901/47 X |
| 4,086,522 | 4/1978 | Engleberger et al. | 198/341 X |
| 4,254,433 | 3/1981 | Dewar, Jr. et al. | 901/7 X |
| 4,256,947 | 3/1981 | De Candia | 901/7 X |
| 4,453,303 | 6/1984 | Leddet | 29/407 |
| 4,589,184 | 5/1986 | Asano et al. | 29/714 X |
| 4,623,296 | 11/1986 | McGuire et al. | 901/7 X |
| 4,669,168 | 6/1987 | Tamura et al. | 901/7 X |
| 4,670,974 | 6/1987 | Antoszewski et al. | 901/7 X |

OTHER PUBLICATIONS

Sensor Review, Jul. 1984; published by IFS Publication Ltd., Bedford, England; pp. 125 to 128.
"Assembly and Machine Loading will Dominate General Motors Robotic Program", The Industrial Robot, Dec. 1981, pp. 230-232.

Primary Examiner—Robert J. Spar
Assistant Examiner—Jay I. Alexander
Attorney, Agent, or Firm—Spencer & Frank

[57] ABSTRACT

An apparatus for automatic glazing of cars which comprises a robot having a robot arm. A tool is mounted on the robot arm for gripping a window glass, and two T.V. cameras are fixed along a conveyor line for respectively taking images of front and rear pillars of a body shell stopped at a predetermined position. T.V. cameras are mounted on the gripping tool for taking images of a window frame for position compensation of the window glass, and an image processing unit is provided for distinguishing the kinds of body shells and for calculating position variations of the stopped body shell with respect to predetermined positions thereof from the images. A control unit is provided for receiving signals corresponding to the position variations from the image processing unit and for moving the robot so as to compensate for position variations.

1 Claim, 13 Drawing Figures

APPARATUS FOR AUTOMATIC GLAZING OF CARS

BACKGROUND OF THE INVENTION

The invention relates to an apparatus for the automatic glazing of cars, particularly, an apparatus for distinguishing one type of car body from another and setting a window glass of the distinguished car to the body shell accurately by compensating for position variations of the window glass by means of a robot with T.V. cameras.

An apparatus of this kind is known from U.S. Pat. No. 4,453,303. This apparatus is one for setting a window glass to the body shell having a synchronized relation with the movement of the conveyor while variations of the window glass in the vertical and transverse directions with respect to the window frame are compensated for by means of four to six proximity sensors provided on the mobile tool. This apparatus, however, has disadvantages in that it can be used only in connection with the same cars and at the same locations. Because the proximity sensors are used as detecting means, only the distance between the tool and the body shell can be detected, and moreover there is no way to cope with irregular situation such as the body shell being out of the detectable range of the proximity sensors.

Further, another apparatus of this kind is known from the description on pages 125 to 128 of Sensor Review; published by IFS Publication Ltd., Bedford, England. In this apparatus, a robot is used and, as shown in FIG. 13, two cameras Cc, Cd provided at upper position of the gripping tool for a window glass, two other cameras Ca, Cb respectively provided at lateral positions of the gripping tool and floodlight projectors (not shown) are used as the position detecting means. Further, two stepping motors Ma, Mb for vertical movement and limited rotation of the gripping tool and one stepping motor Mc for transverse movement of the gripping tool are used. The cameras respectively include a 256-diode self-scanning array. The robot detects the position variations by the cameras and compensates the position variations by means of the stepping motors when setting a window glass. In this apparatus, however, the position of the robot arm is not compensated and only the position of the gripping tool is compensated. This method is disadvantageous when the working time allowed to the robot is short, because the sensing of the position variation needs five or six seconds which is considered to be a long time.

An object of the invention is to provide accurate automatic glazing of cars.

Another object of the invention is to provide an automatic glazing apparatus which is capable of distinguishing different kinds of body shells and setting a window glass to the body shell accurately by compensating the position of the window glass.

SUMMARY OF THE INVENTION

An apparatus according to the invention comprises a robot having a robot arm, a tool mounted on the robot arm for gripping a window glass, a first set of two T.V. cameras fixed along a conveyor line for respectively taking images of the front and rear pillars of a body shell stopped at a predetermined position, a second set of T.V. cameras mounted on the gripping tool for taking images of a window frame for position compensation of the window glass, an image processing unit for distinguishing between different kinds of body shells and for calculating position variations of the stopped body shell with respect to predetermined positions thereof from the images, and a control unit for receiving signals corresponding to the position variations from the image processing unit and for moving the robot so as to compensate for position variations.

The T.V. cameras fixed along the conveyor line take images of the front and rear pillars of a body shell stopped at a predetermined position, respectively. The image processing unit calculates the distance between the pillars from the images. In the image processing unit, the distances between the pillars of various kinds of body shells transferred by the conveyor line are previously memorized and the unit compares the actually calculated distance and the prememorized distances and distinguishes the kind of stopped body shell by selecting one of the body shells which has the nearest distance to the calculated distance to send a distinguishing signal to the control unit. The control unit moves the robot so as to grip a window glass corresponding to the kind of body shell.

Further, the image processing unit also calculates any position variations of the front and rear pillars of the stopped body shell in the longitudinal direction with respect to the prememorized reference stop position to send a signal corresponding to such position variations to the control unit. The control unit moves the robot to the window glass setting position which is compensated in accordance with the position variations.

The T.V. cameras mounted on the gripping tool comprises two cameras mounted on the lower side of the gripping tool. The two cameras take images of two reference members mounted on the window frame with a constant distance therebetween. The image processing unit calculates vertical, transverse and angular position variations of the reference member with respect to the reference position thereof which is prememorized in the image processing unit and sends signals corresponding to such variations to the control unit. The control unit moves the robot so as to compensate such variations.

In an embodiment of the invention, two more cameras for minor adjustment of the window glass in the transverse direction are mounted on the gripping tool at both transverse sides thereof. They take images of the window glass and the window frame, respectively. The image processing unit compares the distances between the edge of the window glass and the edge of the window frame at the left and right sides to send a signal to the control unit. The control unit moves the robot so as to make the distances equal to each other.

Thus, a window glass can be accurately set on the window frame of the body shell.

Accordingly, the invention can obviate the above explained drawbacks of the prior art.

BRIEF DESCRIPTIONS OF THE DRAWINGS

DETAILED DESCRIPTION OF THE PREFERRED EMBODIMENTS

Figure 1:
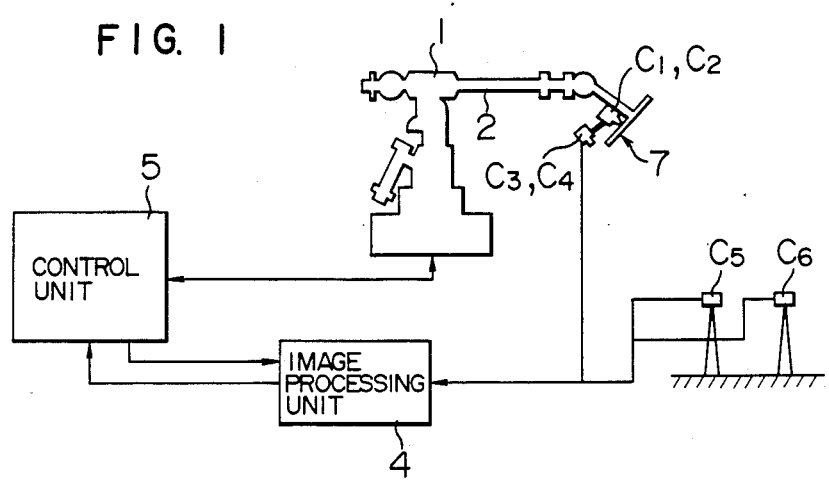
FIG. 1 is a block diagram of an apparatus for automatic glazing of cars which is one embodiment of the invention.
Figure 2:
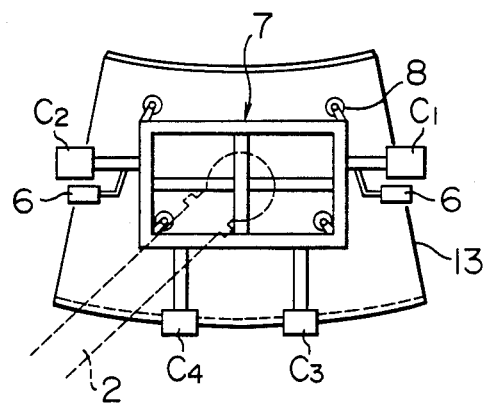
FIG. 2 is an enlarged perspective view showing the gripping tool of FIG. 1 with a glass being supported thereby.
Figure 3:
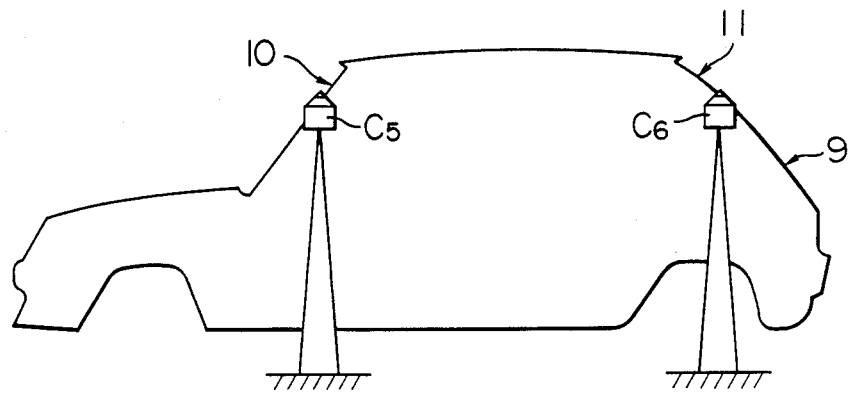
FIG. 3 is a side view showing an arrangement of the body shell and the T.V. cameras fixed along the conveyor line.

Referring to the drawings, an embodiment of the invention will be explained. The apparatus for automatic glazing of cars of the invention comprises a robot 1 having a robot arm 2, a tool 7 mounted on the end of the robot arm 2 for gripping a window glass 13, two T.V. cameras C5, C6 fixed along a conveyor line, four T.V. cameras C1, C2, C3, C4 mounted on the gripping tool 7, an image processing unit 4 and a control unit 5 for controlling the robot 1. The gripping tool 7 is provided with suction cups 8 for holding the window glass 13. The T.V. cameras C1, C2 are mounted on the gripping tool 7 at both lateral sides and the T.V. cameras C3, C4 are mounted on the lower side of the gripping tool 7 spaced apart from each other. Under the cameras C1, C2 slit light beam projectors 6 are provided. The T.V. cameras C5, C6 are fixed along the conveyor line with a constant distance therebetween. The camera C5 takes an image (shown in FIG. 4) of the front pillar 10 (see FIG. 3) of the body shell 9 which is stopped at a predetermined position and the camera C6 takes an image (shown in FIG. 5) of the rear pillar 11 of the stopped body shell 9. The image processing unit 4 calculates the distance between the front and rear pillars 10, 11 of the stopped body shell 9 from the images. In the image processing unit 4, the distances between the pillars of various kinds of body shells which are transferred by the conveyor line are previously memorized. The image processing unit 4 compares the actually calculated distance and the prememorized distances and distinguishes the kind of stopped body shell 9 by selecting one of the body shells which has the nearest distance to the calculated distance. Thus the kind of stopped body shell is distinguished from others and a signal corresponding to the body shell identification is sent to the control unit 5. The control unit 5 then moves the robot 1 so as to select a window glass for the distinguished kind of the body shell.

Figure 4:
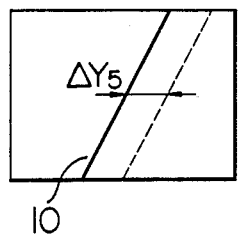
FIGS. 4 and 5 are respectively images of the front pillar and the rear pillar taken by the cameras of FIG. 3.
Figure 5:
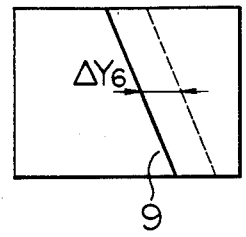
Figure 6:
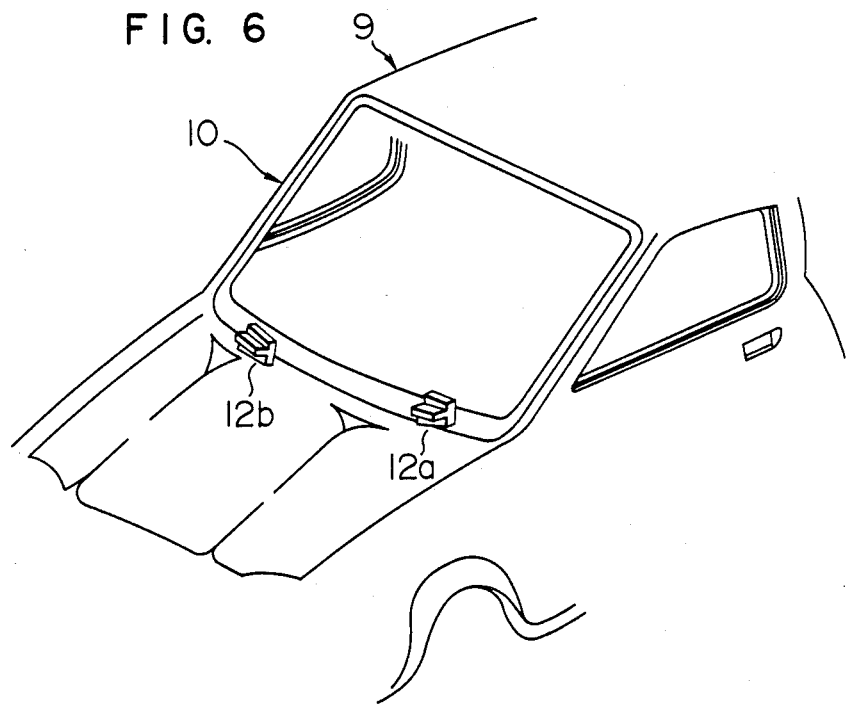
FIG. 6 is a perspective view showing a window frame at the front side of a car.

Further, as shown in FIGS. 4, 5, in which the prememorized pillar positions of the body shell are shown by the dotted line, the image processing unit 4 also calculates the position variations $\Delta Y5$, $\Delta Y6$ of the front and rear pillars of the stopped body shell in the longitudinal direction with respect to the predetermined positions of the kind of body shell distinguished and sends a signal corresponding to such position variations to the control unit 5. The control unit 5 moves the robot 1 to a glass setting position which is compensated in accordance with the position variations.

Figure 8:
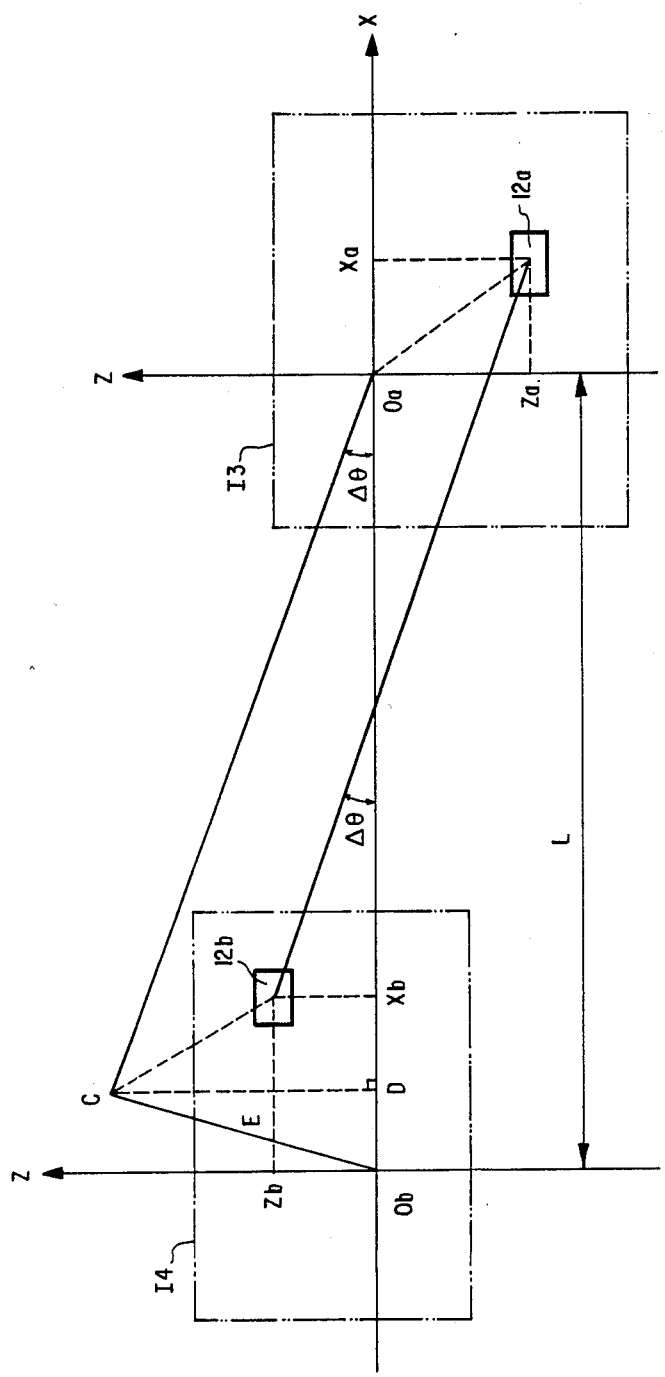
FIG. 8 shows respectively images of the reference members taken by the cameras mounted on the lower side of the gripping tool.

The T.V. cameras mounted on the gripping tool 7 comprises two cameras C3, C4 mounted on the lower side of the gripping tool 7. The cameras C3, C4 take images $I_3$ and $I_4$ (as shown in FIG. 8) of reference members 12a, 12b mounted on the window frame with a constant distance therebetween. The image processing unit 4 calculates vertical, transverse and angular position variations of the reference members 12a, 12b with respect to the reference position thereof. In the image processing unit 4, the reference positions of the reference members 12a, 12b are previously memorized. As can be seen in FIG. 8 in which the reference positions of the reference members 12a and 12b are shown as the origins $O_a$ and $O_b$ of the coordinate axes, and assuming that the vertical and the transverse positions of the reference members 12a, 12b from the prememorized reference positions thereof are Za, Zb, Xa and Xb, the angular variation $\Delta\theta$ is expressed as follows:

$$\Delta\theta = \cos^{-1}\{(2L^2 - (Xa - Xb)^2 - (Za - Zb)^2)/2L^2\}, \quad (1)$$

where $\Delta\theta$ is the angle between the x-axis and a line connecting the actual positions of members 12a and 12b, and L is the distance between the origins $O_a$ and $O_b$.

The angle $\Delta\theta$ is derived by moving the line connecting positions 12a and 12b parallel to itself until one end coincides with the origin $O_a$ and the other end, corresponding to the actual position of the reference member 12b, is at a point C. It can be seen that in the right triangle $O_bDC$, the side $O_bD$ equals $|Xa - Xb|$ and the side DC equals $|Za - Zb|$. Therefore, from the Pythagorean theorem $$(O_bC)^2 = (Xa - Xb)^2 + (Za - Zb)^2 \quad (2)$$

Applying the law of cosines to the triangle $O_aO_bC$ $$(O_bC)^2 = (O_aC)^2 + (O_aO_b)^2 - 2(O_aO_b)(O_aC)\cos\Delta\theta \quad (3)$$

Substituting equation (2) in equation (3) and recognizing that since $\Delta\theta$ is small and $O_aC$ is only slightly greater than $O_aO_b$ (which is equal to L), $O_aC$ is approximately equal to L, then $$(Xa - Xb)^2 + (Za - Zb)^2 = L^2 + L^2 - 2(L)(L)\cos\Delta\theta \quad (4)$$

Rearranging terms $$\cos\Delta\theta = \frac{2L^2 - (Xa - Xb)^2 - (Za - Zb)^2}{2L^2} \quad (5)$$

which is equivalent to equation (1).

Figure 7:
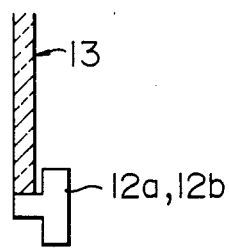
FIG. 7 is a partial side view of the window glass and the reference member.

The image processing unit 4 sends signal corresponding to the angular variation to the control unit 5. The control unit 5 moves the robot 1 so as to compensate for the angular variation. Then the image processing unit 4 calculates the vertical and transverse position variations of the reference members 12a, 12b to send signals to the control unit 5. The control unit 5 moves the robot 1 so as to compensate for the variations. It is preferable, as shown in FIG. 7, to provide shoulders for mounting the lower edge of the window glass thereon with the reference members 12a, 12b. By virtue of the shoulders, the positioning of the window glass in the vertical direction is more securely effected. Thus, the window glass 13 is set accurately with respect to the reference members 12a, 12b.

Figure 9:
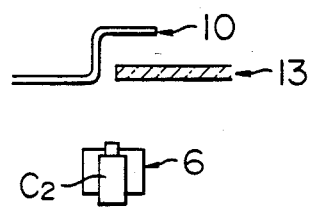
FIGS. 9 and 10 are respectively a plan view and a side view showing an arrangement of the cameras mounted on the lateral sides of the gripping tool and the window frame.
Figure 10:
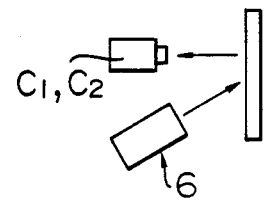
Figure 11:
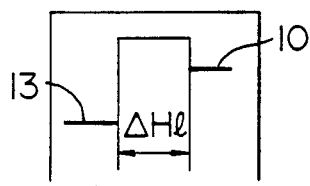
FIGS. 11 and 12 are respectively images taken by the cameras mounted on the lateral sides of the gripping tool.
Figure 12:
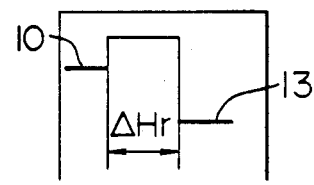
Figure 13:
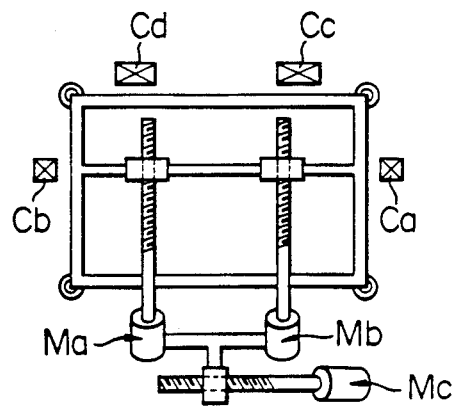
FIG. 13 is a front view of a prior art gripping tool.

In the actual process of setting a window glass, it is possible that the reference members 12a, 12b will not be mounted just at the predetermined position of the window frame and/or the gripping tool 7 will not hold the window glass 13 just at the predetermined position. The cameras C1, C2 and the slit light projectors 6 are provided in order to cope with such cases. As shown in FIGS. 9 and 10, the slit light projectors 6 are mounted under the cameras C1, C2. The slit light projectors 6 emit a slit light beam in the transverse direction, namely, the direction across the window glass 13 and the frame. The cameras C1, C2 take images of the window glass 13 and the window frame. The images taken by the cameras C1, C2 are shown in FIGS. 11 and 12. The image processing unit 4 compares the distance ΔHl between the edges of the window glass 13 and the frame at the left side and the distance ΔHr of the right side to send a signal to the control unit 5. The control unit 5 moves the robot 1 so as to make the distances equal to each other.

Thus, the window glass 13 is accurately set on the window frame of the body shell.

What is claimed is:

1. An apparatus for automatic glazing of cars comprising:
   a robot having a robot arm;
   a gripping tool mounted on said robot arm for gripping a window glass;
   a first set of two T.V. cameras fixed along a conveyor line for respectively taking images of front and rear pillars of a body shell stopped at a predetermined position;
   a second set of T.V. cameras mounted on said gripping tool for taking images of a window frame for position compensation of said window glass, said second set of T.V. cameras mounted on said gripping tool comprising two cameras mounted on the lower side of said gripping tool and two cameras mounted on transverse sides of said gripping tool, said lower side cameras respectively taking images of reference members mounted on the lower portion of said window frame for supporting the lower end of said window glass and said transverse side cameras respectively taking images of transverse ends of said window glass and frame;
   an image processing unit for distinguishing between different kinds of body shells and for calculating position variations of the stopped body shell with respect to predetermined positions thereof from images of said first set of two T.V. cameras fixed along the conveyor line and said second set of T.V. cameras mounted on said gripping tool; and
   a control unit for receiving a signal representing a distinguished kind of body shell from said image processing unit to move said robot arm to select a window glass of said distinguished kind of body shell and for receiving signals corresponding to the position variations from said image processing unit to move the robot arm so as to compensate for said position variations.

* * * * *